(12) United States Patent

Nakagawa et al.

(10) Patent No.: US 9,153,825 B2
(45) Date of Patent: Oct. 6, 2015

(54) FUEL CELL

(75) Inventors: Takashi Nakagawa, Osaka (JP);
Toshihiro Matsumoto, Osaka (JP);
Shinsuke Takeguchi, Osaka (JP);
Miyuki Yoshimoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 626 days.

(21) Appl. No.: 12/747,808

(22) PCT Filed: Nov. 13, 2009

(86) PCT No.: PCT/JP2009/006094
§ 371 (c)(1),
(2), (4) Date: Jun. 11, 2010

(87) PCT Pub. No.: WO2010/064366
PCT Pub. Date: Jun. 10, 2010

(65) Prior Publication Data
US 2010/0285384 A1 Nov. 11, 2010

(30) Foreign Application Priority Data
Dec. 2, 2008 (JP) .................................. 2008-307651

(51) Int. Cl.
*H01M 8/02* (2006.01)
*H01M 8/04* (2006.01)
*H01M 8/10* (2006.01)

(52) U.S. Cl.
CPC ............ *H01M 8/026* (2013.01); *H01M 8/0254* (2013.01); *H01M 8/0263* (2013.01);
(Continued)

(58) Field of Classification Search
CPC ................... H01M 2008/1095; H01M 8/0254; H01M 8/026; H01M 8/0263; H01M 8/0265; H01M 8/04291
USPC ........................... 429/454, 456, 457, 512–514
See application file for complete search history.

(56) References Cited

U.S. PATENT DOCUMENTS 5,773,160 A * 6/1998 Wilkinson et al. ............ 429/434
7,014,939 B2 * 3/2006 Suenaga et al. ............... 429/465
(Continued)

FOREIGN PATENT DOCUMENTS

JP 2001-006698 1/2001
JP 2003-249243 9/2003
(Continued)

OTHER PUBLICATIONS

Extended European Search Report dated Aug. 13, 2012.
(Continued)

*Primary Examiner* — Carlos Barcena
(74) *Attorney, Agent, or Firm* — Greenblum & Bernstein P.L.C.

(57) ABSTRACT

A fuel cell includes: a membrane electrolyte assembly which includes a polymer electrolyte membrane and a pair of catalyst electrodes between which the polymer electrolyte membrane is held and separators between which the membrane electrolyte assembly is held. The first separator includes first gas flow channels and second gas flow channels which are adjacent to the first gas flow channels, the first and second gas flow channels supplying an oxidizing gas or a fuel gas to the membrane electrolyte assembly. The first and second gas flow channels are parallel to each other and are alternately arranged, the first gas flow channels are larger in cross sectional area than the second gas flow channels. The second separator includes first gas flow channels parallel to the first and second gas flow channels of the first separator, and second gas flow channels which are adjacent to the first gas flow channels, the first and second gas flow channels supplying an oxidizing gas or a fuel to the membrane electrolyte assembly. The first and second gas flow channels are parallel to each other and are alternately arranged and the oxidizing gas or fuel gas supplied in the first and second gas flow channels of the first separator flows in an opposite direction to the oxidizing gas or fuel gas supplied in the first and second gas flow channels of the second separator.

9 Claims, 10 Drawing Sheets

(52) U.S. Cl.
CPC ........ *H01M8/0265* (2013.01); *H01M 8/04291* (2013.01); *H01M 2008/1095* (2013.01); *Y02E 60/50* (2013.01)

(56) References Cited

U.S. PATENT DOCUMENTS

| | | | |
|---|---|---|---|
| 2002/0146601 A1* | 10/2002 | Sugiura et al. | 429/13 |
| 2004/0058218 A1 | 3/2004 | Atbi et al. | |
| 2006/0046125 A1 | 3/2006 | Lai | |
| 2007/0105001 A1 | 5/2007 | Ohma | |
| 2007/0111082 A1 | 5/2007 | Morishita | |

FOREIGN PATENT DOCUMENTS

| | | |
|---|---|---|
| JP | 2004-146230 | 5/2004 |
| JP | 2005-32578 | 2/2005 |
| JP | 2005-251699 | 9/2005 |
| JP | 2006-114387 | 4/2006 |
| JP | 2007-165287 | 6/2007 |

OTHER PUBLICATIONS

English translation of Chinese Search Report, dated Mar. 5, 2014.

\* cited by examiner

PRIOR ART

FUEL CELL

TECHNICAL FIELD

The present invention relates to fuel cells and fuel cell stacks.

BACKGROUND ART

Fuel cells generally consist of a polymer electrolyte membrane which selectively transports protons and of a pair of catalyst electrodes (fuel electrode and air electrode) between which the polymer electrolyte membrane is held. Fuel cells with this configuration are capable of continuous electric energy production by using a fuel gas, a gas containing hydrogen, supplied to the fuel electrode as well as an oxidizing gas, a gas containing oxygen, supplied to the air electrode.

The polymer electrolyte membrane consists of electrolyte which includes a polymer ion exchange membrane such as sulfonic group-containing fluorine resin ion exchange membrane or hydrocarbon resin ion exchange membrane. The polymer electrolyte member needs to contain a given amount of water for ion transport capability.

The catalyst electrode includes a catalyst layer and a gas diffusion layer. The catalyst layer contacts the polymer electrolyte membrane and promotes redox reactions in the catalyst electrode. The gas diffusion layer is located on the opposite side of the catalyst layer from the polymer electrolyte membrane and exhibits air permeability and electric conductivity. Moreover, the gas diffusion layer includes a carbon coat layer and a gas diffusion base layer. The carbon coat layer contacts the catalyst layer for improving the contact reliability between the gas diffusion layer and catalyst layer. The gas diffusion base layer diffuses therein supplied gas for uniform gas transport to the catalyst layer. The catalyst layer of the fuel electrode contains, for example, platinum or platinum-ruthenium alloy. The catalyst layer of the air electrode contains, for example, platinum or platinum-cobalt alloy. An assembled stack of a polymer electrolyte membrane and a pair of catalyst electrodes each including a catalyst layer, a carbon coat layer and a gas diffusion base layer is referred to as a membrane electrode assembly (hereinafter "MEA").

MEAs may be electrically connected in series by stacking them atop each other. Conductive separators are interposed between the MEAs to avoid possible mixing between fuel and oxidizing gases as well as to establish electrical connection between the MEAs.

The separators are of two types: a fuel electrode separator which contacts the fuel electrode; and an air electrode separator which contacts the air electrode. The fuel electrode separator includes fuel gas flow channels through which a fuel gas is supplied to the MEA, and the air electrode separator includes oxidizing gas flow channels through which an oxidizing gas is supplied to the MEA.

As described above, the polymer electrolyte membrane needs to contain a given amount of water in order to offer ion transport capability. Thus, the gas is generally pre-humidified to ensure sufficient water content in the fuel cell. However, a humidifier for reaction gases does not contribute to electricity generation. Moreover, it requires an installation space. Thus, successful development of fuel cells that require no humidifiers is expected to lead to downsized fuel cell systems for overall cost reduction.

Moreover, if fuel cells requiring no humidifier can be developed, energy loss by such a humidifier can be avoided and therefore overall electricity generation efficiency increases. There has therefore been a continuing need in the art for the development of fuel cells capable of maintaining electricity generation efficiency even when supplying less- or non-humidified reaction gases.

Methods are known by which water generated during the operation of the fuel cell is kept within the fuel cell to ensure a given amount of water in the fuel cell without having to humidify reaction gases (see, e.g., Patent Document 1).

The fuel cell disclosed by Patent Document 1 is so configured that the oxidizing gas supplied in the oxidizing gas flow channels and the fuel gas supplied in the fuel gas flow channels are made to flow in opposite directions, and a coolant flow channel is provided above the oxidizing gas outlet for partial cooling of the oxidizing gas outlet.

FIG. 1 is a cross-sectional view illustrating a fuel cell disclosed by Patent Document 1. The fuel cell includes MEA 1 and a pair of air electrode separator 2 and fuel electrode separator between which MEA 1 is held. Air electrode separator 2 includes oxidizing gas flow channels 8, and fuel electrode separator 3 includes fuel gas flow channels 16.

As shown in FIG. 1, oxidizing gas and fuel gas flow in opposite directions. Moreover, coolant flow channel 15 is provided above oxidizing gas outlet 10, thereby cooling the oxidizing gas flowing near gas outlet 10. Cooling the oxidizing gas flowing near gas outlet 10 causes condensation of moisture in the gas, whereby water in the oxidizing gas can be recovered. In this way water generated in the fuel cell can be retained in the fuel cell.

In the fuel cell disclosed by Patent Document 1, all of the oxidizing gas flow channels are made uniform in width and depth for uniform distribution of oxidizing gas in the fuel cell.

Technologies are presented by which gas flooding is avoided by appropriately increasing or decreasing the cross sectional areas of the reaction gas flow channels provided in the separators along their lengths (see, e.g., Patent Document 2).

Technologies are also known by which curling of metal separators, which are made of stamped metal plate and include multiple gas flow channels formed therein, is reduced by using different flow channel volumes for adjacent gas flow channels (see, e.g., Patent Document 3).

Technologies are also known by which the reaction gas distribution is made uniform in the fuel cell by controlling the respective volumes of gas flow channels in the separators (see, e.g., Patent Document 4).

[Patent Document 1] Japanese Patent Application Laid-Open No. 2003-249243
[Patent Document 2] Japanese Patent Application Laid-Open No. 2006-114387
[Patent Document 3] Japanese Patent Application Laid-Open No. 2005-32578
[Patent Document 4] U.S. Patent Application Publication No. 2007/0105001

DISCLOSURE OF INVENTION

Problems to be Solved by the Invention

In the fuel cell disclosed by Patent Document 1, however, the MEA shows a non-uniform water distribution because only a small amount of water moves into the fuel gas flow channel from the oxidizing gas flow channel. The reason for this will be described below.

Water generated at the air electrode catalyst layer during the operation of the fuel cell diffuses out in the oxidizing gas flow channels in the form of water vapor. Thus, the oxidizing gas has a higher water content than the fuel gas.

As shown in FIG. 1, in the fuel cell disclosed by Patent Document 1, there is no difference in volume between the fuel gas flow channel and oxidizing gas flow channel. Further, the flow amount of the oxidizing gas in the oxidizing gas flow channel is generally larger than the flow amount of the fuel gas in the fuel gas flow channel. For these reasons, in the fuel cell disclosed by Patent Document 1, the difference in water content per unit volume is small between the oxidizing gas and fuel gas because, even when the oxidizing gas contains a high water content, the flow amount of the oxidizing gas is large.

Because water transport from the oxidizing gas flow channel to the fuel gas flow channel is promoted with increasing water content per unit volume difference between the oxidizing gas and fuel gas, sufficient water transport is not achieved in the fuel cell disclosed by Patent Document 1.

Even when the oxidizing gas at the gas outlet is cooled for condensation of moisture as in the fuel cell disclosed by Patent Document 1, a large fraction of water contained in the oxidizing gas is discharged to the outside through the oxidizing gas outlet together with the oxidizing gas.

It is therefore an object of the present invention to provide a fuel cell capable of retaining a sufficient water for uniform water distribution in the fuel cell even using less- or non-humidified reaction gases.

Means for Solving the Problem

The inventors established that water transport from the oxidizing gas flow channel to the fuel gas flow channel is promoted by employing different cross-sectional areas for adjacent oxidizing gas flow channels. The inventors conducted further studies to complete the present invention.

Specifically, the present invention relates to fuel cells described below.

[1] A fuel cell including:
  a membrane electrolyte assembly which includes a polymer electrolyte membrane and a pair of catalyst electrodes between which the polymer electrolyte membrane is held; and
  separators A and B between which the membrane electrolyte assembly is held,
  wherein the separator A includes first gas flow channels a1 and second gas flow channels a2 which are placed adjacent to the first gas flow channels a1, the first and second gas flow channels a1 and a2 supplying an oxidizing gas or a fuel gas to the membrane electrolyte assembly,
  the first and second gas flow channels a1 and a2 run in parallel to each other and are alternately arranged,
  the first gas flow channels a1 are larger in cross sectional area than the second gas flow channels a2;
  wherein the separator B includes first gas flow channels b1 which run in parallel to the first and second gas flow channels a1 and a2, and second gas flow channels b2 which are placed adjacent to the first gas flow channels b1, the first and second gas flow channels supplying an oxidizing gas or a fuel to the membrane electrolyte assembly,
  the first and second gas flow channels b1 and b2 run in parallel to each other and are alternately arranged; and
  wherein the oxidizing gas or fuel gas supplied in the first and second gas flow channels a1 and a2 flows in opposite direction to the oxidizing gas or fuel gas supplied in the first and second gas flow channels b1 and b2.

[2] The fuel cell according to [1], wherein the separator A is an air electrode separator, the first gas flow channel a1 is a first oxidizing gas flow channel, the second gas flow channel a2 is a second oxidizing gas flow channel, the separator B is a fuel electrode separator, the first gas flow channel b1 is a first fuel gas flow channel, and the second gas flow channel b2 is a second fuel gas flow channel.

[3] The fuel cell according to [1] or [2], wherein the first gas flow channels b1 are smaller in cross sectional area than the second gas flow channels b2,
  the first gas flow channels a1 are on the direct opposite side of the membrane electrolyte assembly from the first gas flow channels b1, and
  the second gas flow channels a2 are on the direct opposite side of the membrane electrolyte assembly from the second gas flow channels b2.

[4] The fuel cell according to [3], wherein the first gas flow channels a1 are large in depth than the second gas flow channels a2, and the first gas flow channels b1 are smaller in depth than the second gas flow channels b2.

[5] The fuel cell according to any one of [1] to [4], wherein the first gas flow channels a1 are 0.8-1.2 mm in width and 0.3-0.8 mm in depth, and the second gas flow channels a2 are 0.8-1.2 mm in width and 0.06-0.1 mm in depth.

[6] The fuel cell according to any one of [1] to [5], wherein the oxidizing gas has a dew point of $-10°$ C. to $75°$ C., and the temperature of the fuel cell at which the fuel cell generates electricity is $55°$ C. to $100°$ C.

[7] The fuel cell according to any one of [1] to [6], wherein the separators A and B have a waveform cross section having uniform thickness.

[8] The fuel cell according to any one of [1] to [7], wherein the separators A and B are metal separators.

[9] A fuel cell stack including a cell stack consisting of a plurality of fuel cells according to [7] or [8] stacked on top of each other,
  wherein any two of the adjacent fuel cells selected from the cell stack are defined as fuel cell X and fuel cell Y respectively, the fuel cells X and Y are electrically connected via separator Ax of the fuel cell X and separator By of the fuel cell Y,
  a back surface of a first gas flow channel a1 of the separator Ax contacts a back surface of a first gas flow channel b1 of the separator By, and
  a back surface of a second gas flow channel a2 of the separator Ax contacts a back surface of a second gas flow channel b2 of the separator By.

Advantageous Effect of the Invention

A fuel cell according to the present invention can circulate water within the cell even when less- or non-humidified reaction gases are supplied, thus allowing a sufficient amount of water to be retained in the fuel cell and achieving a uniform water distribution even when such reaction gases are supplied. Thus, the fuel cell offers high MEA durability and high output density.

BEST MODE FOR CARRYING OUT THE INVENTION

Figure 1:
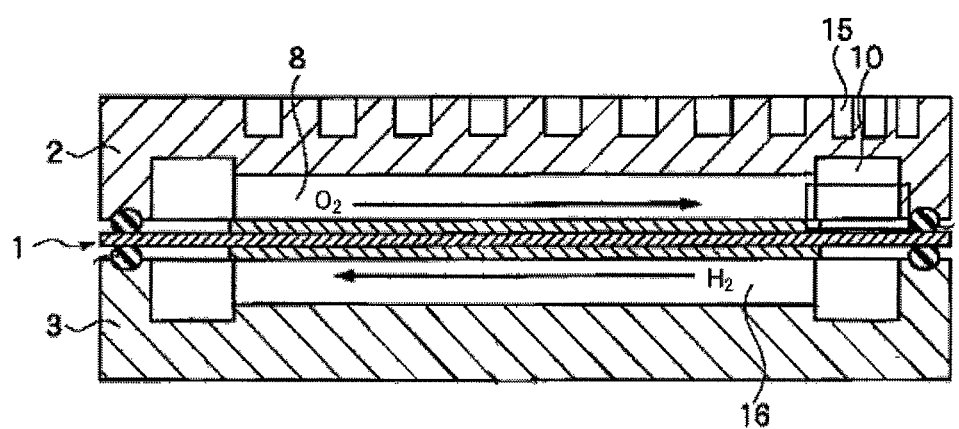
FIG. 1 is a cross-sectional view of a conventional fuel cell.

A fuel cell according to the present invention includes an MEA and a pair of separators A and B between which the MEA is held. In the fuel cell, less- or non-humidified reaction gases are supplied.

(1) Membrane Electrode Assembly (MEA)

The MEA includes a polymer electrolyte membrane and a pair of catalyst electrodes (fuel electrode and air electrode) between which the polymer electrolyte membrane is held. The air electrode preferably includes an air electrode catalyst layer which contacts the polymer electrode membrane, and an air electrode gas diffusion layer stacked on the air electrode catalyst layer. Similarly, the fuel cell preferably includes a fuel electrode catalyst layer which contacts the polymer electrolyte membrane, and a fuel electrode gas diffusion layer stacked on the fuel electrode catalyst layer.

The polymer electrolyte membrane is a polymer membrane which selectively transports protons in a humidified state. Materials for the polymer electrode membrane are not specifically limited as long as they selectively transport protons; examples of such materials include fluoropolymer electrolyte membranes and hydrocarbon polymer electrolyte membranes. Examples of fluoropolymer electrolyte membrane products include Nafion® (DuPont), Flemion® (Asahi Glass, Co., Ltd.), Aciplex® (Asahi Kasei Corporation), and GORE-SELECT® (Japan Gore-Tex Inc.)

The air electrode catalyst layer includes a catalyst which promotes a redox reaction between hydrogen and oxygen. Materials for the air electrode catalyst layer are not specifically limited as long as they are conductive as well as are capable of catalyzing a redox reaction between hydrogen and oxygen. For example, the air electrode catalyst layer includes as a catalyst platinum, platinum-cobalt alloy, or platinum-cobalt-nickel alloy, etc.

The fuel electrode catalyst layer includes a catalyst which promotes a hydrogen oxidization reaction. Materials for the fuel electrode catalyst layer are not specifically limited as long as they are electrically conductive as well as are capable of catalyzing a hydrogen oxidation reaction. For example, the fuel electrode catalyst layer includes as a catalyst platinum or platinum-ruthenium alloy, etc.

For example, the air electrode catalyst layer and fuel electrode catalyst layer are prepared as follows: carbon fine particles (e.g., acetylene black, Ketjen black or Vulcan fine particles) bearing any of the above catalysts, a proton-conductive electrolyte, and a water-repellent resin (e.g., polytetrafluoroethylene (PTFE)) are mixed together, followed by application of the obtained mixture over the polymer electrolyte membrane.

The gas diffusion layers (air electrode gas diffusion layer and fuel electrode layer) are porous conductive layers placed farthest away from the MEA (they contact the respective separators). Materials for the gas diffusion layers are not specifically limited as long as they are conductive as well as are capable of diffusing reaction gases. The gas diffusion layer may include a gas diffusion base layer and a carbon coat layer. The gas diffusion base layer diffuses the gas supplied from the separator side into the catalyst layer, and the carbon coat layer improves the contact reliability between the gas diffusion layer and catalyst layer. The gas diffusion layers may be prepared by heat-pressing onto the catalyst layer surface a carbon cloth made of carbon fibers having water-repellent resin such as PTFE or fibrous carbon.

(2) Separators

The separators are conductive plates having thereon multiple gas flow channels defined by ribs. Reaction gases (oxidizing gas and fuel gas) are supplied to the respective electrodes via the gas flow channels. The separator may be fabricated by engraving the surface of a carbon plate with gas flow channels (see FIG. 3A). Alternatively, the separator may be fabricated by stamping a conductive plate for defining gas flow channels (see FIG. 4). The conductive plate may be made of either carbon or metal. Separator fabricated by stamping a metal plate is also referred to as metal separator. A separator manufactured by stamping of a conductive plate (hereinafter simply referred to as "separator with a waveform cross section") includes a waveform cross section of uniform thickness and flow channels defined on both sides of the separator. Specifically, a first surface of the separator with a waveform cross section includes alternating grooves and ribs formed thereon and, therefore, the opposite surface of the separator from the first surface includes alternating ribs and grooves. The grooves of the first surface correspond to the ribs of the opposite surface and the ribs of the first surface correspond to the grooves of the opposite surface.

A feature of the present invention lies in the separator structure. Hereinafter, i) separator A and ii) separator B will be described.

i) Separator A

Separator A is a conductive plate which includes multiple gas flow channels defined by ribs. A fuel cell according to the present invention is characterized in that separator A includes gas flow channels with a large cross sectional area, i.e., large volume (hereinafter "first gas flow channels a1") and gas flow channels with a small cross sectional area, i.e., small volume (hereinafter "second gas flow channels a2"). As used herein, "cross section" refers to a transverse section of a gas flow channel which is perpendicular to the channel length. The cross sectional area ratio between first gas flow channel a1 and second gas flow channel a2 is preferably 5:1 to 9:1.

First gas flow channels a1 and second gas flow channels a2 preferably run in parallel to each other. Moreover, preferably, first gas flow channels a1 and second gas flow channels a2 are alternately arranged. The interval between first gas flow channel a1 and second gas flow channel a2 is preferably 0.7-1.3 mm.

Adjustment of the gas flow channel volume may be accomplished by adjusting the gas flow channel width or gas flow channel a1 is preferably 0.8-1.2 mm in width and 0.3-0.8 mm in depth. Second gas flow channel a2 is preferably 0.8-1.2 mm in width and 0.06-0.1 mm in depth.

Figure 2:
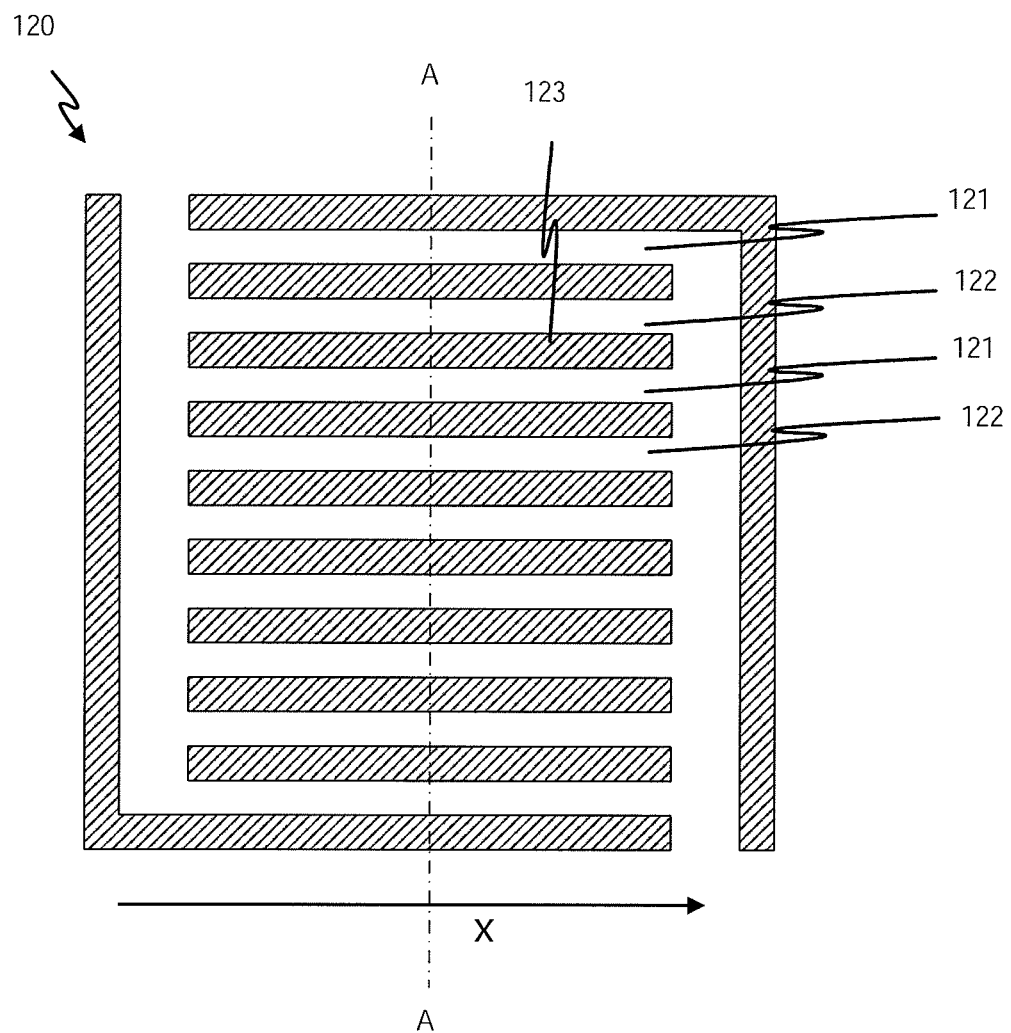
FIG. 2 is a plan view of an air electrode separator of an fuel cell according to an embodiment of the present invention.

FIG. 2 illustrates an example where the volumes of gas flow channel of separator A are adjusted by adjusting their depths. FIG. 2 is a plan view of an example of separator A according to the present invention. As shown in FIG. 2, separator A 120 includes first gas flow channels 121, second gas flow channels 122, and ribs 123 which define first and second gas flow channels 121 and 122. As shown in FIG. 2, first and second gas flow channels 121 and 122 run in parallel to each other, and are alternately arranged.

Figure 3A:
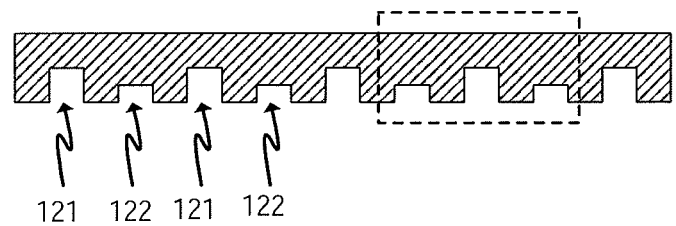
FIGS. 3A and 3B are cross-sectional views of the air electrode separator of FIG. 2.
Figure 3B:
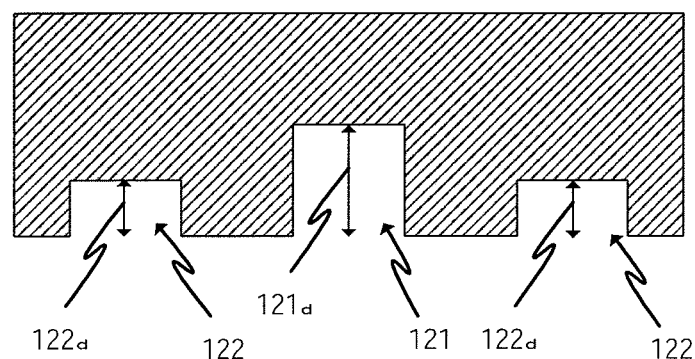

FIG. 3A is a cross-sectional view, cut along A-A line, of separator A 120 shown in FIG. 2. FIG. 3B is an enlarged view of the dashed rectangular area of separator A 120 shown in FIG. 3A. As shown in FIGS. 3A and 3B, depth 121d of first gas flow channel 121 is larger than depth 122d of second gas flow channel 122. Thus, first gas flow channel 121 is larger in cross sectional area than second gas flow channel 122. Therefore, first gas flow channel 121 is larger in volume than second gas flow channel 122.

In the present invention, separator A is preferably an air electrode separator. Thus, in the present invention, gas flow channels in separator A are preferably are oxidizing gas flow channels through which oxidizing gas is supplied to the air electrode. Hereinafter, "separator A," "first gas flow channel a1" and "second gas flow channel a2" are also referred to as "air electrode separator," "first oxidizing gas flow channel" and "second oxidizing gas flow channel," respectively.

ii) Separator B

Separator B is a conductive plate which includes two or more gas flow channels defined by ribs. In the present invention, gas flow channels of separator B run in parallel with those of separator A. It is preferable that separator B be made of the same material as separator A. In particular, employing metal separators A and B offers advantages in the manufacturing process because one metal separator with a certain flow channel pattern may selectively serve as separator A or separator B.

In a fuel cell according to the invention, separator B includes first gas flow channels b1 and second gas flow channels b2 placed adjacent to first gas flow channels b1. Preferably, first gas flow channels b1 and second gas flow channels b2 run in parallel to each other and are alternately arranged. First gas flow channels b1 may be identical in cross sectional area to second gas flow channels b2, but are preferably smaller in cross sectional area than second gas flow channels b2. The cross sectional area ratio between first gas flow channel b1 and second gas flow channel b2 is preferably 1:5 to 1:9.

Adjustment of gas flow channel volume may be achieved by adjustment of the gas flow channel width or gas flow channel depth, preferably gas flow channel depth. First gas flow channel b1 is preferably 0.8-1.2 mm in width and 0.06-0.1 mm in depth. Second gas flow channel b2 is preferably 0.8-1.2 mm in width and 0.3-0.8 mm in depth.

In the present invention, separator B is preferably a fuel electrode separator. Thus, gas flow channels in separator B are preferably fuel gas flow channels through which a fuel gas is supplied to the fuel electrode. Hereinafter, "separator B," "first gas flow channel b1" and "second gas flow channel b2" are also referred to as "fuel electrode separator," "first fuel gas flow channel" and "second fuel gas flow channel," respectively.

(3) Positional Relationship Between Oxidizing Gas Flow Channels (Separator A Gas Flow Channels) and Fuel Gas Flow Channels (Separator B Gas Flow Channels)

In a fuel cell according to the present invention, it is preferable that oxidizing gas flow channels and fuel gas flow channels be located directly opposite each other across the MEA. It is most preferable that first oxidizing gas flow channels be on the direct opposite side of the MEA from first fuel gas flow channels, and that second oxidizing gas flow channels be on the direct opposite side of the MEA from second fuel gas flow channels.

Figure 4:
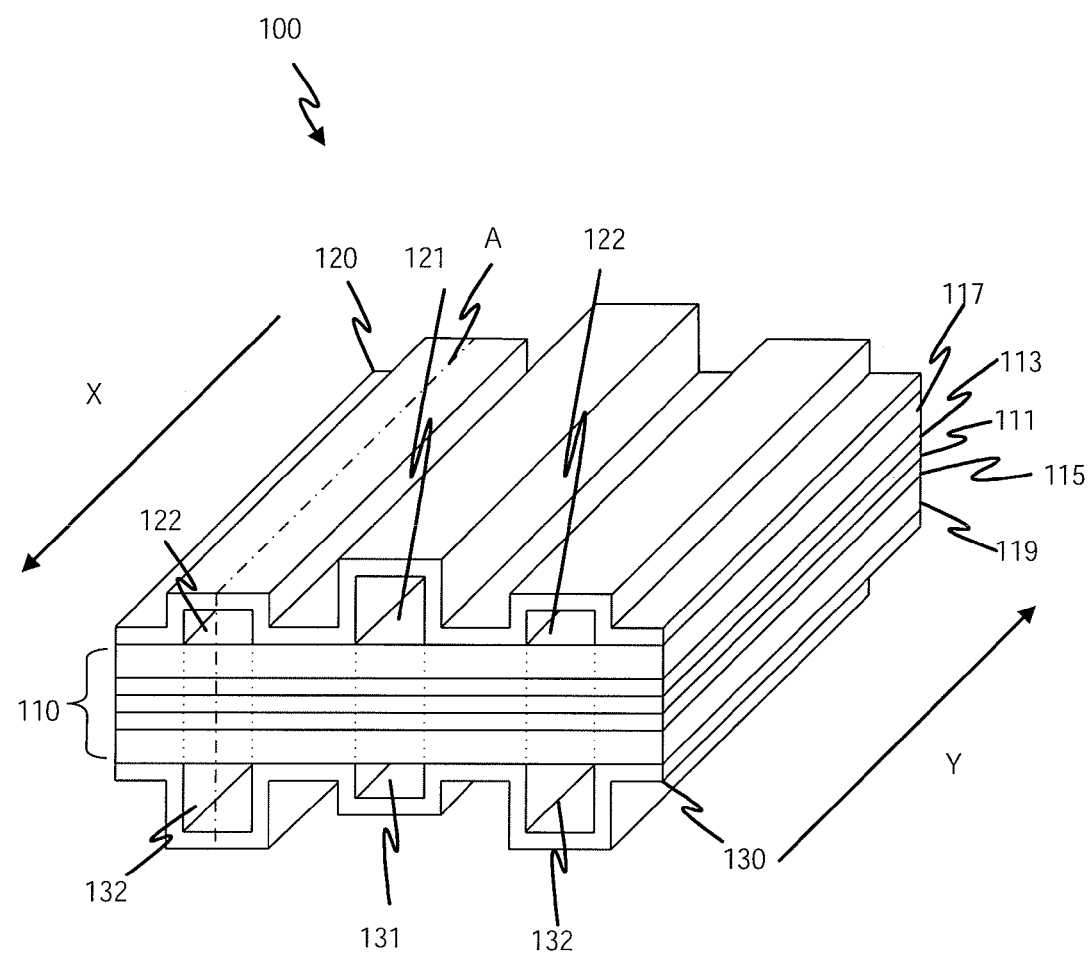
FIG. 4 is a partial perspective view of a fuel cell according to an embodiment of the present invention.

FIG. 4 is a partial perspective view of a fuel cell according to the present invention, illustrating the positional relationship between oxidizing gas flow channels (separator A gas flow channels) and fuel gas flow channels (separator B gas flow channels).

As shown in FIG. 4, fuel cell 100 includes MEA 110, air electrode separator (separator A) 120, and fuel electrode separator (separator B) 130. MEA 110 includes polymer electrolyte membrane 111, air electrode catalyst layer 113, fuel electrode catalyst layer 115, air electrode gas diffusion layer 117, and fuel electrode gas diffusion layer 119. Air electrode separator 120 and fuel electrode separator 130 shown in FIG. 4 are separators having a waveform cross sections.

Air electrode separator 120 includes first oxidizing gas flow channels 121 (first gas flow channels a1) and second oxidizing gas flow channels 122 (second gas flow channels a2). Fuel electrode separator 130 includes first fuel gas flow channels 131 (first gas flow channels b1) and second gas flow channels 132 (second gas flow channels b2). First oxidizing gas flow channels 121 are larger in cross sectional area than second oxidizing gas flow channels 122. First fuel gas flow channels 131 are smaller in cross sectional area than second fuel gas flow channels 132.

In FIG. 4, arrow X indicates the direction in which oxidizing gas flows through an oxidizing gas flow channels, and arrow Y indicates the direction in which a fuel gas flows through fuel gas flow channels. As shown in FIG. 4, the oxidizing gas and fuel gas flow in opposite directions in the flow channels.

With this configuration in which first oxidizing gas flow channels and second oxidizing gas flow channels which are smaller in volume than the first oxidizing gas flow channels are arranged alternately and in which oxidizing gas and fuel gas are made to flow in opposite directions in the gas flow channels, it is possible to promote transport of water, which has been generated during electricity generation of the fuel cell, from the oxidizing gas flow channels to the fuel gas flow channels. The mechanism of this will be described later.

As shown in FIG. 4, it is also preferable that the oxidizing gas flow channels and fuel gas flow channels are located directly opposite each other across the MEA. Specifically, first oxidizing gas flow channels 121 are on the direct opposite side of the MEA from first fuel gas flow channels 131, and second oxidizing gas flow channels 122 are on the direct opposite side of the MEA from second fuel gas flow channels 132. The cross sectional area ratio between the second oxidizing gas flow channel and second fuel gas flow channel is preferably 1:5 to 1:9.

Figure 5:
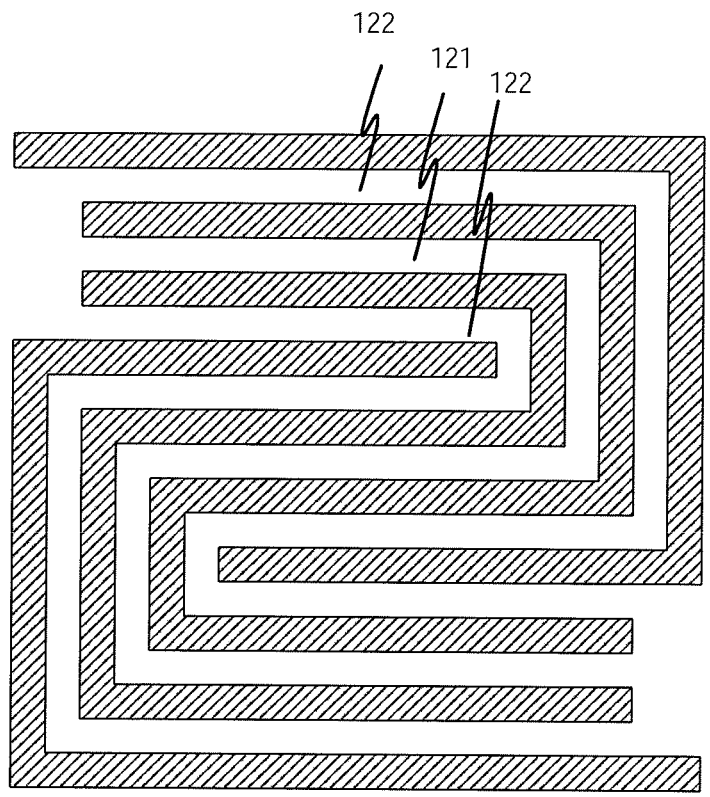
FIG. 5 is a plan view of an air electrode separator of a fuel cell according to an embodiment of the present invention.

So far, embodiments where linear oxidizing gas flow channels are provided in the air electrode separator have been explained (see FIG. 2). In some embodiments, the oxidizing gas flow channels may serpentine as shown in FIG. 5.

When using serpentine oxidizing gas flow channels, it is preferable to form serpentine fuel gas flow channels correspondingly.

A fuel cell stack may be manufactured by stacking fuel cells according to the present invention on top of each other. Such a fuel cell stack includes a cell stack consisting of fuel cells; current collectors; insulating plates; and end plates. The cell stack is sandwiched between the current collectors, insulating plates and end plates. The cell stack and the other members are fixed together with fixing rods.

When manufacturing a fuel cell stack, it is preferable to employ an air electrode separator and a fuel electrode separator which have a waveform cross section.

Figure 6:
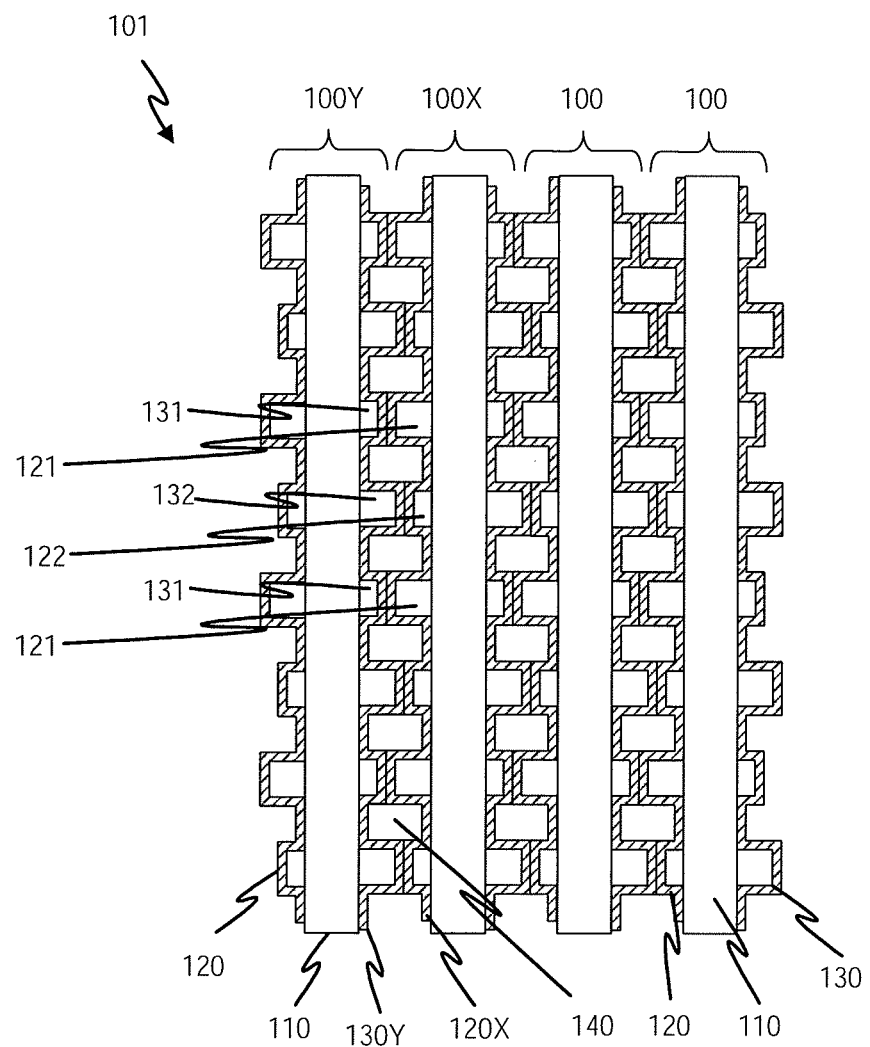
FIG. 6 is cross-sectional view of a fuel cell stack according to an embodiment of the present invention.

FIG. 6 is a cross-sectional view of fuel cell stack 101 which includes an air electrode separator and a fuel electrode separator, both of which are separators with a waveform cross section. In fuel cell stack 101, as shown in FIG. 6, fuel cell 101X is placed adjacent to fuel cell 101Y. Fuel cells 100X and 100Y are electrically connected via air electrode separator 120X of fuel cell 100X and fuel electrode separator 130Y of fuel cell 100Y. Specifically, the back surface of first oxidizing gas flow channel 121 of air electrode separator 120X contacts the back surface of first fuel gas flow channel 131 of fuel electrode separator 130Y, whereas the back surface of second oxidizing gas flow channel 122 of air electrode separator 120X contacts the back surface of second fuel gas flow channel 132 of fuel electrode separator 130Y. As a result, flow channels 140 of equal volume are formed between air electrode separator 120X and fuel electrode separator 130Y. In fuel cell stack 101, flow channels 140 may serve as coolant flow channels.

In such a fuel cell stack manufactured by stacking fuel cells on top of each other, each of which includes an air electrode separator and fuel electrode separator which are made of metal, there is no need to separately provide coolant flow channels. This enables size reduction in fuel cell stacks.

Figure 7:
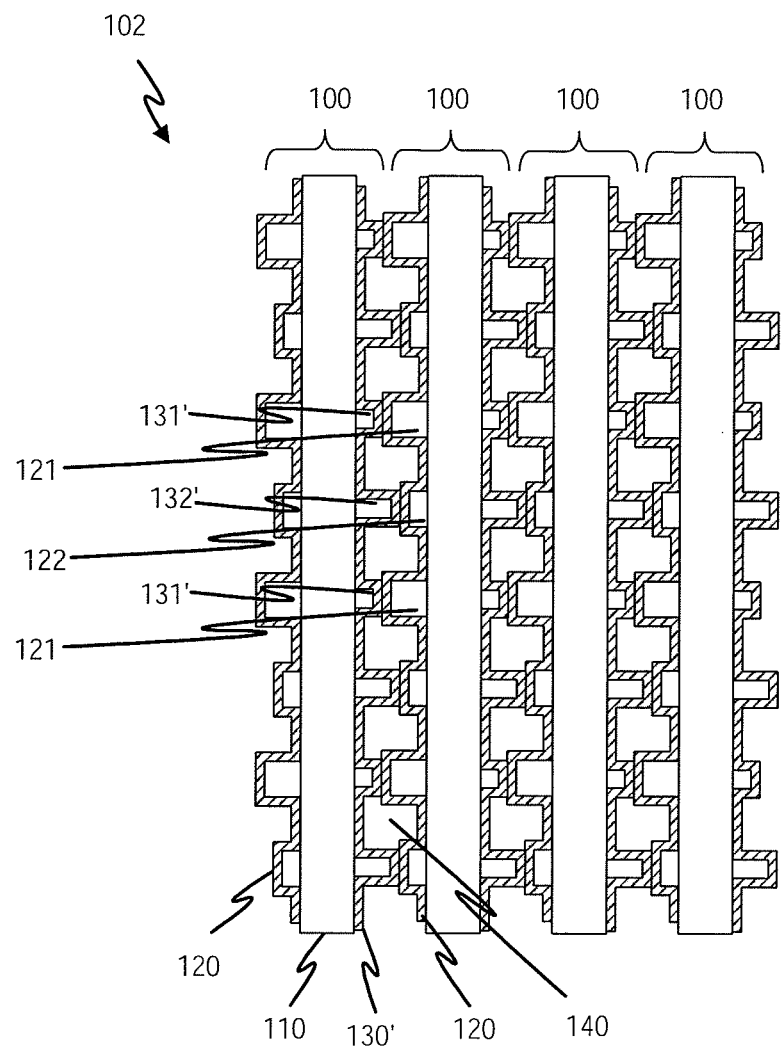
FIG. 7 is cross-sectional view of a fuel cell stack according to an embodiment of the present invention.

Either of the fuel gas flow channel or oxidizing gas flow channel may be narrowed in width. FIG. 7 is a cross-sectional view of fuel cell stack 102 consisting of stacked fuel cells each including fuel gas flow channels which are smaller in width than oxidizing gas flow channels. In fuel cell stack 102, the same members as those of fuel cell stack 101 shown in FIG. 6 are given the same reference numerals without providing specific description.

As shown in FIG. 7, fuel gas flow channels 131' and 132' in fuel electrode separator 130' are smaller in width than oxidizing gas flow channels 121 and 122. Thus, the fuel gas flow channels are small in back surface area than the oxidizing gas flow channels. This configuration reduces the possible contact area variations between stacked fuel cells even when slight displacement occurs between the fuel cells in the fuel cell stack. Thus, it is possible to reduce generated electricity level unevenness due to fuel cell displacement in the fuel cell stack.

A fuel cell according to the present invention is characterized in that it can retain therein a sufficient amount of water for high output density even when less- or non-humidified reaction gases are employed. Specifically, a fuel cell according to the present invention offers high output density even when operated under a moderate-temperature, non-humidified condition or a high-temperature, less-humidified condition.

As used herein, "moderate-temperature, non-humidified condition" refers to an operation condition in which oxidizing gas to be supplied to the fuel cell is not humidified. Specifically, the moderate-temperature, non-humidified condition refers to a condition in which the temperature of the fuel cell at which it generates electricity is 55° C. to 75° C.; the dew point of the oxidizing gas to be supplied to the fuel cell is 45° C. or less, preferably −10° C. to 45° C.; and the dew point of the fuel gas to be supplied to the fuel cell is 50° C. to 70° C. Dew point increases with increasing water content in the gas, and decreases with decreasing water content in the gas. Under such a moderate-temperature, non-humidified condition, the dew point of the oxidizing gas is generally at least 20° C. lower than the dew point of the fuel gas.

As used herein, "high-temperature, less-humidified condition" refers to au operation condition in which the temperature of the fuel cell at which it generates electricity is 80° C. to 100° C.; the dew point of the oxidizing gas is 55° C. to 75° C.; and the dew point of the fuel gas is 50° C. to 70° C. Under such a high-temperature, less-humidified condition, the difference in dew point between the oxidizing gas and fuel gas is generally 10° C. or less.

Fuel gas supplied to a fuel cell cogeneration system is generated by reforming a hydrocarbon gas using a reformer. Such a reformed gas has a dew point generally ranging from 50° C. to 70° C.

(4) Mechanism by which Water Circulates Throughout a Fuel Cell According to the Present Invention Next will be devoted to a description of a mechanism by which a fuel cell according to the present invention retains a sufficient amount of water for uniform water distribution in the cell even when supplying less- or non-humidified reaction gases.

By supplying an oxygen-containing oxidizing gas through oxidizing gas flow channels and supplying a hydrogen-containing fuel gas through fuel gas flow channels, electric energy can be attained from the fuel cell. Electric energy is produced through the reactions described below.

Firstly, hydrogen molecules supplied to the fuel electrode diffuse out in the fuel electrode gas diffusion layer and then reach the fuel electrode catalyst layer, where they are dissociated into protons and electrodes. The protons move through the humidified polymer electrolyte membrane to the air electrode, whereas the electrons move through an external circuit to the air electrode. The electrons moving through the external circuit may be utilized as electric energy. In the air electrode catalyst layer, the protons transported from the polymer electrolyte membrane, the electrons transported from the external circuit, and the oxygen molecules supplied to the air electrode react together to form water, which is converted into water vapor and diffuses out mainly in the oxidizing gas flow channels.

In conventional fuel cells, water that has diffused out in the oxidizing gas flow channels is discharged to the outside through the oxidizing gas outlet together with oxidizing gas. A fuel cell according to the present invention is characterized in that it is capable of circulating water contained in the oxidizing gas throughout the cell. Hereinafter, with reference to the accompanying drawings, a description is given as to how water moves in the fuel cell.

Figure 8:
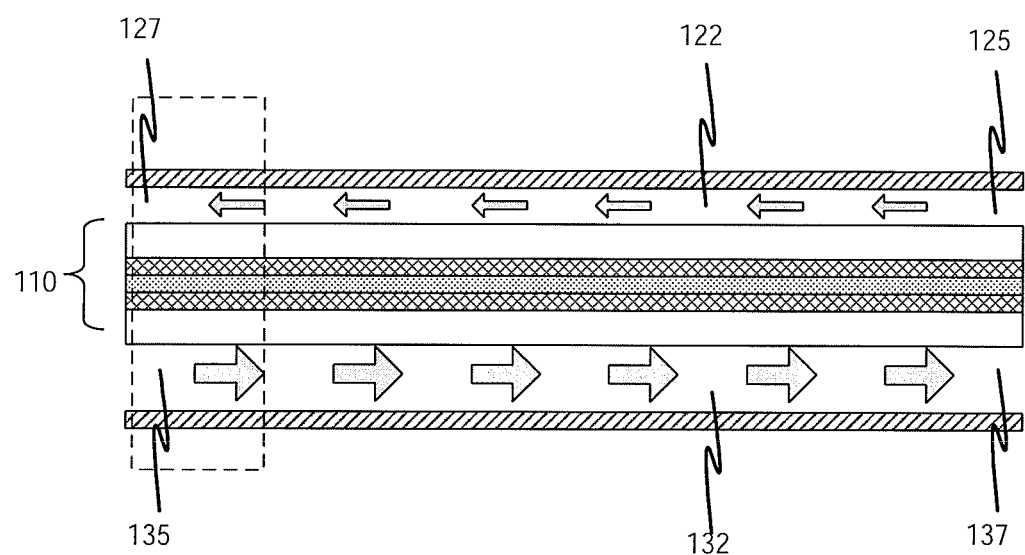
FIG. 8 is cross-sectional view of a fuel cell according to another embodiment of the present invention.

FIG. 8 is a cross-sectional view, cut along dashed line A, of fuel cell 100 shown in FIG. 4. Specifically, FIG. 8 illustrates a vertical section of second oxidizing flow channel 122 and a vertical section of second fuel gas flow channel 132. Arrows in the drawing indicates flow direction and the arrow size indicates flow amount. As described above, second oxidizing gas flow channels 122 are smaller in volume than second fuel gas flow channels 132 which are on the direct opposite side of MEA 110 from second oxidizing flow channels 122. Thus, a small quantity of oxidizing gas passes through second oxidizing gas flow channels 122. Most of the oxygen molecules in the oxidizing gas passing through second oxidizing gas flow channels are therefore consumed around second oxidizing gas inlet 125, reducing the overall oxygen level in the oxidizing gas passing through second oxidizing gas flow channels 122. Thus, the water content is relatively high in the oxidizing gas which passes through the second oxidizing gas flow channels.

Second fuel gas flow channels 132, on the other hand, have a high volume; therefore, a large amount of fuel gas passes through second fuel gas flow channels 132. Moreover, because water generated during the operation of the fuel cell diffuses out mainly in the oxidizing gas flow channels as described above, the fuel gas passing through second fuel gas flow channels 132 contains a smaller amount of water. Thus, the water content in the fuel gas passing through second fuel gas flow channels 132 is small.

The net result of the above is that the oxidizing gas passing through second oxidizing gas flow channel 122 has a higher water content than the fuel gas passing through second fuel gas flow channel 132. This water content difference promotes water transport from second oxidizing gas flow channel 122 to second fuel gas flow channel 132.

Because water generated during electricity generation diffuses out in the oxidizing gas flow channels as described above, the oxidizing gas receives water when passing through the oxidizing gas flow channels. Thus, the oxidizing gas has a maximum water content in the vicinity of oxidizing gas outlet 127.

The fuel gas has a maximum hydrogen content in the vicinity of fuel gas inlet 135, because hydrogen molecules in the fuel gas are consumed while the fuel gas passes through the fuel gas flow channel. Thus, the water content difference between the oxidizing gas and fuel gas becomes most significant in the vicinity of oxidizing gas outlet 127 and fuel gas inlet 135 (see the dashed rectangular area in FIG. 8). Thus, water transport is most promoted from the vicinity of oxidizing gas flow outlet 127 to the vicinity of fuel gas flow inlet 135.

Electricity generation decreases near oxidizing gas outlet 127 due to low oxygen level in the oxidizing gas. Reduced electricity generation hinders electro-osmotic water transport from the fuel electrode to the air electrode, whereby water transport from the second oxidizing gas flow channel to the second fuel gas flow channel is further promoted.

As water is allowed to move from the second oxidizing gas flow channel to the second fuel gas flow channel in this way, generated water which is otherwise discharged to the outside together with oxidizing gas in conventional fuel cells can be efficiently circulated in the fuel cell. Water diffused out in the fuel gas flow channels flows together with the fuel gas, travelling again in the fuel cell to achieve a uniform water distribution in the cell.

The volumes of the first oxidizing gas flow channels are large enough to provide a sufficient amount of oxidizing gas to the fuel cell.

With the above fuel cell configuration in which oxidizing gas flow channels, which are smaller in volume than oxidizing gas flow channels, are placed on the direct opposite side of the MEA from the fuel gas flow channels and in which the oxidizing gas and fuel gas are made to flow in opposite directions, it is possible to retain a sufficient amount of water in the fuel cell for high output density and high MEA durability even when employing less- or non-humidified reaction gases.

(5) First Simulation of Fuel Cell Operation

To demonstrate that a uniform water distribution is attained in the fuel cell by relatively reducing the volumes of the second oxidizing gas flow channels, changes in humidity in the reaction gas flow channel with changes in the second oxidizing gas flow channel depth were simulated. In this simulation, the widths of the first and second oxidizing gas flow channels were set at 1 mm; the depth of the first oxidizing gas flow channels was set at 0.5 mm; the widths of the first and second fuel gas flow channels were set at 1 mm; the depth of the second fuel gas flow channel was set at 0.5 mm; the depth of the first fuel gas flow channels was set at the same level as the second oxidizing gas flow channels; and the fuel cell temperature at electricity generation was set at 90° C.

Figure 9A:
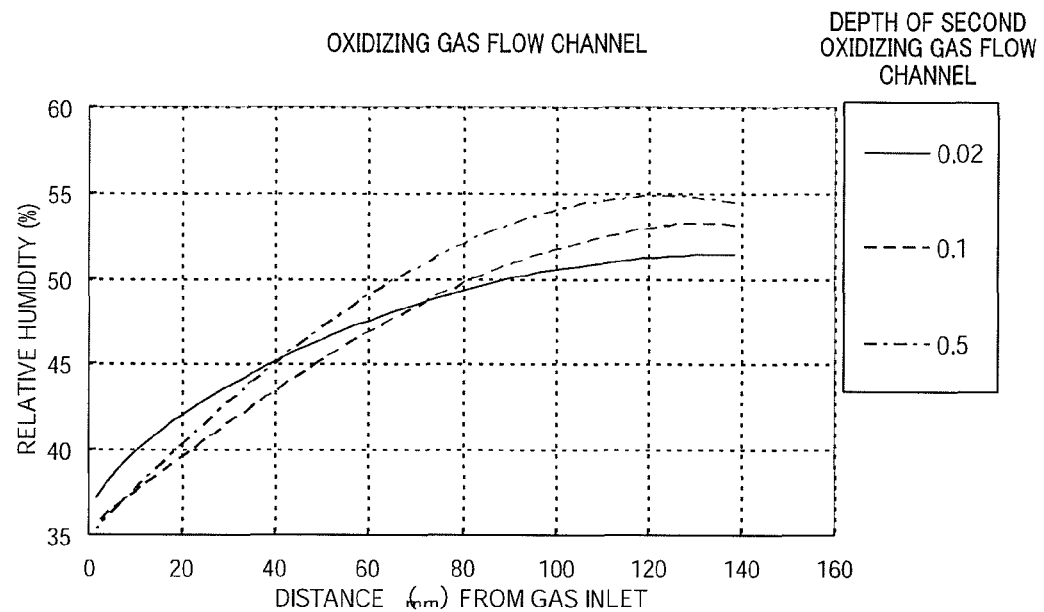
FIGS. 9A and 9B are graphs of humidity in reaction gas channel vs. depth of second oxidizing gas flow channel.

FIG. 9A is a graph of humidity in oxidizing gas channel vs. depth of second oxidizing gas flow channel. As shown in FIG. 9A, when there is no volumetric difference between the first and second oxidizing gas flow channels (i.e., second oxidizing gas flow channel is 0.5 mm in depth), the oxidizing gas flow channels showed a relative humidity of about 35% near the upstream end and showed a relative humidity of about 55% near the downstream end.

When the second oxidizing gas flow channels were 0.1 mm in depth, the oxidizing gas flow channels showed a relative humidity of about 35% near the upstream end and showed a relative humidity of about 53% near the downstream end.

When the second oxidizing gas flow channels were 0.02 mm in depth, the oxidizing gas flow channels showed a relative humidity of about 37% near the upstream end and showed a relative humidity of about 51% near the downstream end.

It was thus demonstrated that relative humidity variations across the oxidizing gas flow channel decrease with decreasing depth of the oxidizing gas flow channel.

Figure 9B:
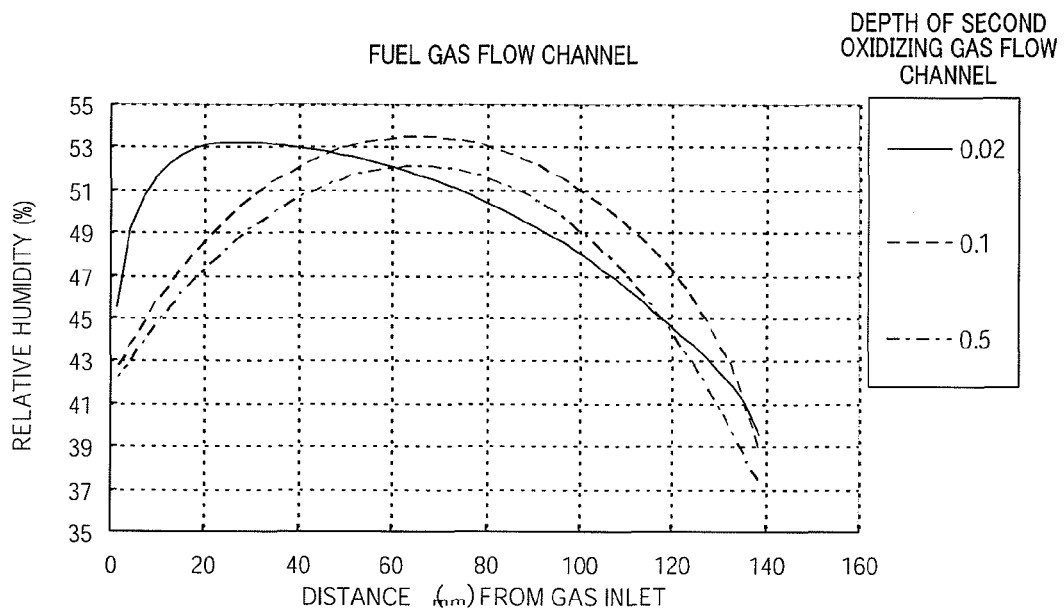

FIG. 9B is a graph of humidity in fuel gas channel vs. depth of second oxidizing gas flow channel. As shown in FIG. 9B, when there is no volumetric difference between the first and second oxidizing gas flow channels (i.e., second oxidizing gas flow channel is 0.5 mm in depth), the fuel gas flow channels showed a relative humidity of about 42% near the upstream end and showed a relative humidity of about 37% near the downstream end, with a maximum relative humidity being about 52%.

When the second oxidizing gas flow channel was 0.1 mm in depth, the fuel gas flow channels showed a relative humidity of about 43% near the upstream end and showed a relative humidity of about 39% near the downstream end, with a maximum relativity humidity being about 53%.

When the second oxidizing gas flow channel was 0.02 mm in depth, the fuel gas flow channels showed a relative humidity of about 45% near the upstream end and showed a relative humidity of about 39% near the downstream end, with a maximum relative humidity being 53%.

It was thus demonstrated that variations in relative humidity in the fuel gas flow channels decrease with decreasing depth of the oxidizing gas flow channels.

The results shown in FIGS. 9A and 9B suggest that the water distribution in the fuel cell becomes uniform as the depth of the oxidizing gas flow channels decreases.

(6) Second Simulation of Fuel Cell Operation

As demonstrated above, the water distribution in the fuel cell becomes uniform as the depth of the oxidizing gas flow channels decreases. However, when the second oxidizing gas flow channels are too shallow, it may result in reduced oxidizing gas amount in the oxidizing gas flow channels, which may lead to poor electricity generation efficiency. Thus, in this simulation, for an optimal second oxidizing gas flow channel depth, changes in proton conductivity of the polymer electrolyte membrane and generated voltage with changes in the second oxidizing gas flow channel depth were simulated. The simulation condition used for the first simulation above may be used.

Figure 10:
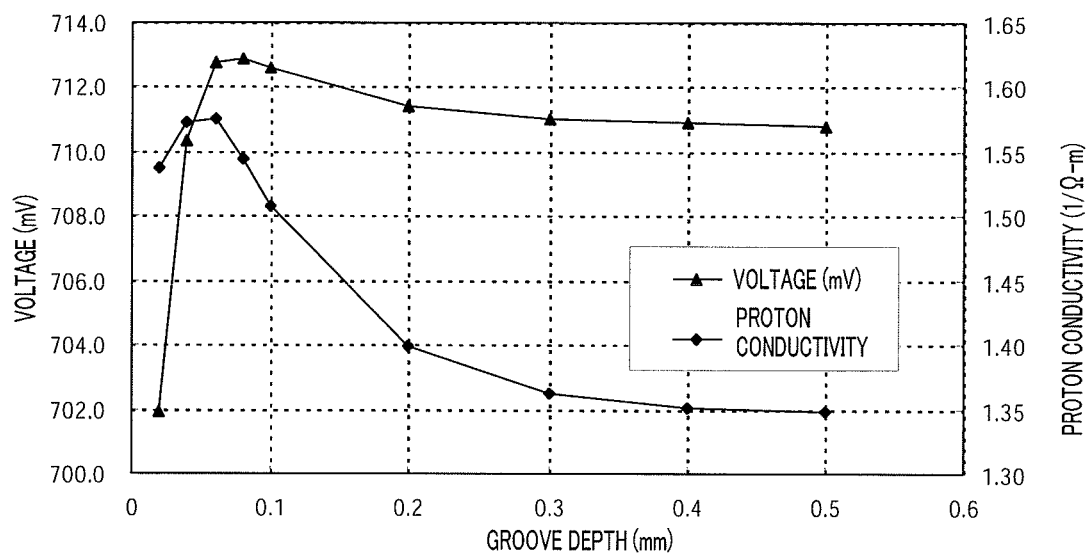
FIG. 10 is a graph of generated voltage and proton conductivity vs. depth of second oxidizing gas flow channel.

FIG. 10 is a graph of generated voltage and proton conductivity vs. depth of second oxidizing gas flow channel. As shown in FIG. 10, the polymer electrolyte membrane showed a maximum proton conductivity when the second oxidizing gas flow channels were 0.06 mm in depth. The generated voltage level was kept high within the second oxidizing gas flow channel depth range of 0.06-0.1 mm, with the voltage peak at the 0.08 mm depth. This graph thus suggests that an optimal second oxidizing gas flow channel depth ranges from 0.06-0.1 mm.

In a fuel cell according to the present invention, second oxidizing gas flow channels, which are smaller in volume than second fuel gas flow channels, are placed on the direct opposite side of the MEA from the second fuel gas flow channels, as well as oxidizing gas and fuel gas are made to flow in opposite directions. With this configuration, water transport from the oxidizing gas flow channels to the fuel gas flow channels can be promoted. It is thus made possible for the fuel cell to retain a sufficient amount of water for high output density and high MEA durability even when employing less- or non-humidified reaction gases.

The present application claims the priority of Japanese Patent Application No. 2008-307651 filed on Dec. 2, 2008, the entire contents of which are herein incorporated by reference.

INDUSTRIAL APPLICABILITY

Fuel cells according to the present invention are useful as polymer electrolyte fuel cells which use less- or non-humidified reaction gases.

EXPLANATION OF REFERENCE NUMERALS

100 . . . Fuel cell
101, 102 . . . Fuel cell stack
1, 110 . . . MEA
111 . . . Polymer electrolyte membrane
113 . . . Air electrode catalyst layer
115 . . . Fuel electrode catalyst layer
117 . . . Air electrode gas diffusion layer
119 . . . Fuel electrode gas diffusion layer
2, 120 . . . Air electrode separator
8 . . . Oxidizing gas flow channel
121 . . . First oxidizing gas flow channel
122 . . . Second oxidizing gas flow channel
123 . . . Rib
125 . . . Oxidizing gas inlet
10, 127 . . . Oxidizing gas outlet
3, 130, 130' . . . Fuel electrode separator
16 . . . Fuel gas flow channel
131, 131' . . . First fuel gas flow channel
132, 132' . . . Second fuel gas flow channel
135 . . . Fuel gas inlet
137 . . . Fuel gas outlet
15, 140 . . . Coolant flow channel

The invention claimed is:

1. A fuel cell comprising:
a membrane electrolyte assembly which includes a polymer electrolyte membrane and a pair of catalyst electrodes between which the polymer electrolyte membrane is held; and
first and second separators between which the membrane electrolyte assembly is held, wherein
the first separator includes first gas flow channels, second gas flow channels positioned adjacent to the first gas flow channels, and coolant flow channels each having a rectangular cross-section and provided between the first and second gas flow channels, the first and second gas flow channels supplying an oxidizing gas or a fuel gas to the membrane electrolyte assembly, the first separator further includes a gas flow outlet for discharging gas from the first gas flow channels and from the second gas flow channels of the first separator,
the first and second gas flow channels extend parallel to each other and are alternately arranged,
the first gas flow channels are larger in cross sectional area than the second gas flow channels,
the second separator includes first gas flow channels which extend parallel to the first and second gas flow channels of the first separator, second gas flow channels which are positioned adjacent to the first gas flow channels of the second separator, and coolant flow channels each having a rectangular cross-section and provided between the first and second gas flow channels of the second separator, the first and second gas flow channels of the second separator supplying an oxidizing gas or a fuel gas to the membrane electrolyte assembly, the second separator further includes a gas flow inlet for supplying gas to the first gas flow channels and to the second gas flow channels of the second separator,
the first and second gas flow channels of the second separator extend parallel to each other and are alternately arranged,
the gas flow outlet of the first separator and the gas flow inlet of the second separator are located directly opposite each other across the membrane electrolyte assembly,
the first and second gas flow channels of the first and second separators are configured such that the oxidizing gas or fuel gas supplied in the first and second gas flow channels of the first separator flows in an opposite direction to a flow direction of the oxidizing gas or fuel gas supplied in the first and second gas flow channels of the second separator, and
for the first separator, the first gas flow channels each have a rectangular cross-section 0.8-1.2 mm wide and 0.3-0.8 mm deep and the second gas flow channels each have a rectangular cross-section 0.8-1.2 mm wide and 0.06-0.1 mm deep.

2. The fuel cell according to claim 1, wherein the first separator is an air electrode separator, the first gas flow channel of the first separator is a first oxidizing gas flow channel, the second gas flow channel of the first separator is a second oxidizing gas flow channel, the separator is a fuel electrode separator, the first gas flow channel of the second separator is a first fuel gas flow channel, and the second gas flow channel of the second separator is a second fuel gas flow channel.

3. The fuel cell according to claim 2, wherein a back surface of the first oxidizing gas flow channel of the air electrode separator contacts a back surface of the first fuel gas flow channel of the fuel electrode separator, and a back surface of the second oxidizing gas flow channel of the air electrode separator contacts a back surface of the second fuel gas flow channel of the fuel electrode separator.

4. The fuel cell according to claim 1, wherein, for the second separator, the first gas flow channels are smaller in cross sectional area than the second gas flow channels,
the first gas flow channels of the first separator are on the opposite side of the membrane electrolyte assembly directly across from the first gas flow channels of the second separator, and
the second gas flow channels of the first separator are on the opposite side of the membrane electrolyte assembly directly across from the second gas flow channels of the second separator.

5. The fuel cell according to claim 4, wherein, for the second separator, the first gas flow channels have a smaller depth than the second gas flow channels.

6. The fuel cell according to claim 5, wherein the first and second separators have a waveform cross section of uniform thickness.

7. The fuel cell according to claim 6, wherein the first and second separators are metal separators.

8. The fuel cell according to claim 1, wherein the oxidizing gas has a dew point of −10° C. to 75° C., and the temperature of the fuel cell at which the fuel cell generates electricity is 55° C. to 100° C.

9. A fuel cell stack comprising a stack of a plurality of fuel cells according to claim 6, the fuel cells being stacked on top of each other,
- wherein when two adjacent fuel cells selected from the cell stack are electrically connected via the first separator of a first fuel cell and second separator of a second fuel cell,
- a back surface of a first gas flow channel of the first separator of the first fuel cell contacts a back surface of a first gas flow channel of the second separator of the second fuel cell, and
- a back surface of a second gas flow channel of the first separator of the first fuel cell contacts a back surface of a second gas flow channel of the second separator of the second fuel cell.

* * * * *